Dec. 17, 1963    E. L. ADAMS ETAL    3,114,595
METHOD FOR DRIVING A CONVENTIONAL EXTRUDER
BY MEANS OF A HYDRAULIC MOTOR
Filed May 4, 1961
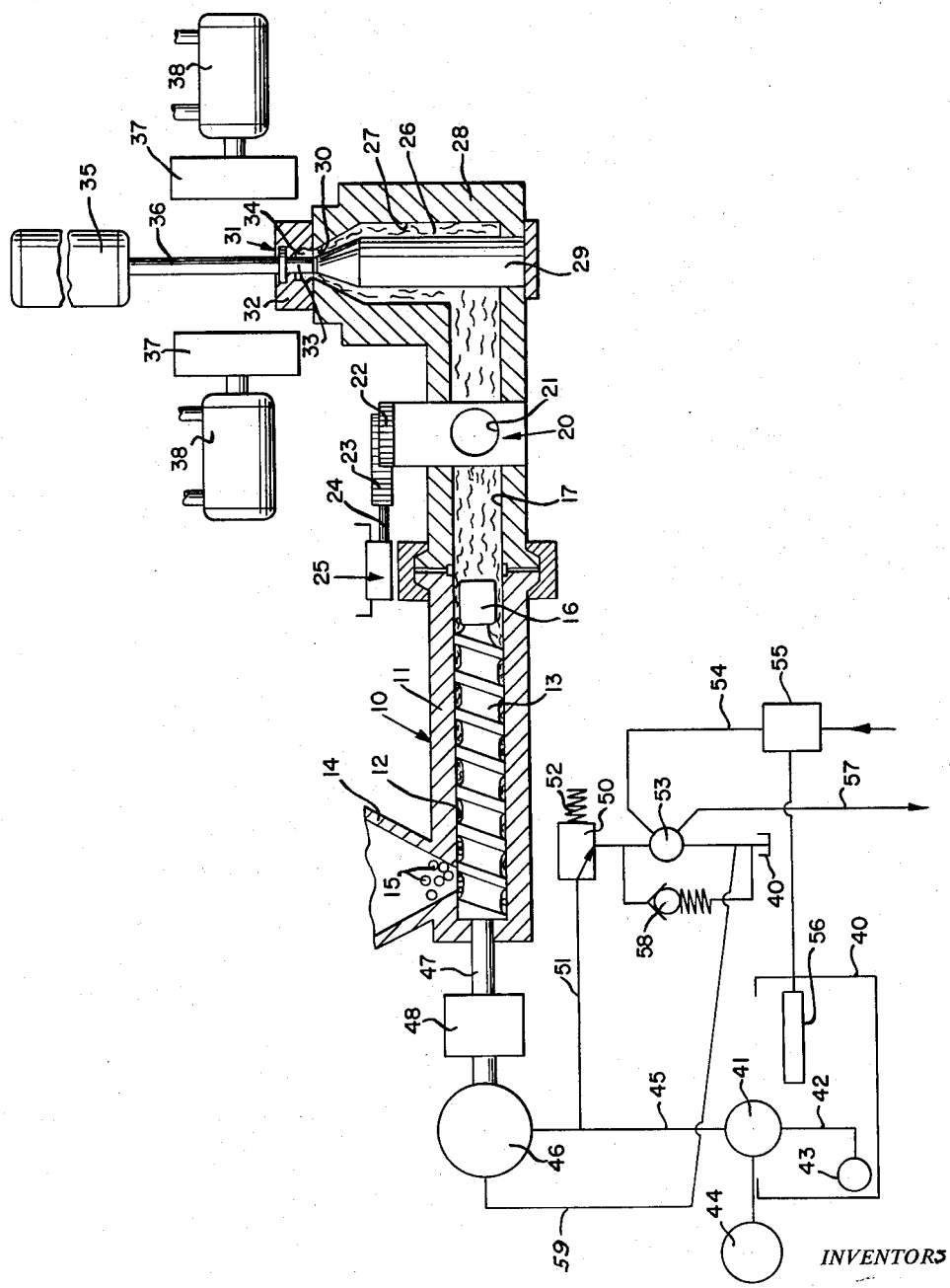
INVENTORS
ELMER L. ADAMS
ROBERT O. ZEIGLER
RAYMOND H. REX
BY W.A. Schaich & Charles S. Lynch
ATTORNEYS

United States Patent Office 3,114,595
Patented Dec. 17, 1963

3,114,595
METHOD FOR DRIVING A CONVENTIONAL EXTRUDER BY MEANS OF A HYDRAULIC MOTOR
Elmer L. Adams, Toledo, Robert O. Zeigler, Holland, and Raymond H. Rex, Toledo, Ohio, assignors to Owens-Illinois Glass Company, a corporation of Ohio
Filed May 4, 1961, Ser. No. 107,811
6 Claims. (Cl. 18—55)

This invention relates to a method of and apparatus for making plastic articles and more particularly to a method of and apparatus for manufacturing plastic articles directly from the plasticized material supplied by an intermittently operated, hydraulically driven extruder.

In the manufacture of plastic articles, such as bottles or the like, one of the most common methods utilized involves the extrusion of a tube which is subsequently inflated or blown within cooperable blow mold sections to form the finished container. As a further refinement of this basic process, the neck or finish portion of the bottle may be injection molded at the extrusion orifice within a separate injection mold which is then moved away from the orifice as the subsequently blown tube is extruded. Such refined processes require the intermittent issuance of plasticized material from the forming orifice. To adapt a screw-type plasticizer to the intermittent issuance of plasticized material at an orifice, several different, complicated systems have been utilized. For example, the plasticizer screw may be continuously rotated with the material issuing therefrom being recirculated from the output end of the screw to a midpoint of the screw or, alternatively, the plasticizer output may be accumulated in an accumulation chamber for subsequent utilization during the next forming cycle. Both of these types of apparatus are in use and operate satisfactorily, although the mechanism and the control of the mechanism is complicated, cumbersome, and expensive.

Another alternative is the intermittent rotation of the extruder screw by controlling the screw-drive motor by timer-actuated or sequence-actuated mechanisms. Systems of this type are also presently utilized, but such timer or sequence controls necessarily completely shut off the extruder screw and the plastic pressure is dissipated, by leakage or the like, intermediate the periods of intermittent issuance of material by the screw, and the cyclic operation of the apparatus is necessarily slowed down by the necessity of building up operating pressures within the plastic upon resumption of screw rotation.

The present invention now provides a new and novel method of and apparatus for intermittently issuing plasticized material from an orifice without the necessity of recirculating material or accumulating material for subsequent use and yet without the loss of pressure within the plastic material, as usually occurs with intermittently driven screw-type plasticizers.

More particularly, the present invention now proposes the utilization of a screw-type plasticizer which is hydraulically driven by a hydraulic motor receiving pressured fluid from a pump to rotate the plasticizer screw, thereby furnishing material to the material output orifice under pressure. Interposed between the output end of the screw and the orifice is a simple on-off valve. When this valve is closed, i.e. in its off position, the screw output is ineffective to express material through the orifice, although the screw is still being driven by the hydraulic motor. The pressure at the output end of the screw will immediately build up to a greater-than-normal pressure, and this pressure will resist further rotation of the screw until the resistance of the screw to rotation overcomes the torque output of the motor. At this time the motor will stall, and the screw will stop rotation.

Any loss of pressure in the screw output material will immediately lower the resistance of the screw to rotation and the motor will rotate the screw to build the pressure back up to that value at which the motor stalls. Thus, the output pressure of the plasticizer is maintained although the plasticizer screw is not being driven. Upon opening of the off-on valve, the pent-up pressure of the plasticized material will drop, the screw will immediately start to rotate, and the pressure built up at the screw output end will be effective to displace material through the orifice. This built-up pressure is substantially greater than the normal output pressure of the plasticizer and may well be utilized for filling an injection mold and maintaining injection molding pressures therein in a combined injection-and-extrusion plastic forming process. Upon opening of the injection mold by its removal from the orifice to extrude the later blown tubular extension integral therewith, normal plasticizer output pressures are available and are utilized to extrude the tube. Upon completion of tube extrusion, the valve is merely shut.

Thus, by means of the present invention, the necessity of recirculating or accumulating plasticizer output are eliminated and the disadvantages of normal intermittent operation of a plasticizer screw are also eliminated.

It is, therefore, an important object of the present invention to provide an improved method of and apparatus for making plastic articles.

Another important object of this invention is the provision of a method of making plastic articles by the utilization of a plasticizer driven by a hydraulic motor and having its output furnished to a forming orifice through an off-on valve.

It is a further object of this invention to provide an apparatus for making plastic articles wherein an extruder screw is driven by a hydraulic motor for supplying plasticized material to an extrusion orifice through an off-on valve, the driving motor being deliberately stalled out by the increased output pressure of the extruder screw as the screw output is confined by closure of the valve and interruption of communication between the screw and the orifice.

Yet another, and no less important, object of this invention, is the provision of a method of making plastic articles from plasticized material supplied by an extruder screw which is hydraulically driven and accommodating interruption of output from the extruder by stalling the hydraulic motor to cease rotation of the screw while maintaining operating pressure in material supplied by the screw by intermittent operation of the hydraulic motor in accordance with pressure fluctuations in the material.

Other objects of this invention will appear in the following description and appended claims, reference being had to the accompanying drawings forming a part of this specification wherein like reference characters designate corresponding parts in the several views.

On the drawings:

The single FIGURE in the drawings schematically illustrates an apparatus capable of carrying out the method of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

In FIGURE 1, reference numeral 10 refers generally to a plasticizer-extruder comprising a barrel 11 having an interior cylindrical surface 12 in close running contact with a helically threaded extruder screw 13. Solid thermoplastic material 15, preferably pelletized, is supplied to the barrel chamber 12 from an upper hopper 14, the solid material 15 entering the passage 12 adjacent the rear end thereof and being mechanically worked and heated during its passage through the barrel passage 12 by the screw 13 and by heater elements (not shown) surrounding the barrel 11 until the material issues in plasticized condition from the outlet end 16 of the extruder screw into an output conduit 17.

Located in the conduit 17 is a rotatable off-on valve indicated generally at 20 and including a port 21. The valve 20 is provided with an upper pinion gear 22 rotatable therewith and meshing with a longitudinally displaceable rack 23 adapted to be actuated, i.e. longitudinally displaced, by the actuating piston 24 of a hydraulic cylinder indicated generally at 25. As illustrated, the valve 20 is in its "off" position wherein the port 22 is turned transversely to the conduit 17, so as to prevent the flow of plasticized material beyond the valve body 20.

Downstream of the valve body 20, the conduit 17 merges into an extrusion chamber 26 defined intermediate the interior peripheral surface 27 of an extrusion block 28 and the exterior cylindrical periphery of an upstanding orifice mandrel 29. The mandrel cooperates with the block at the upper end thereof to define an extrusion orifice 30 communicating fully with the extrusion chamber 26.

Overlying the extrusion orifice 30 is an injection mold, indicated generally at 31, and comprising an outer mold block 32 and a central mold pin 33 abutting the free upper end of the mandrel 29, the core pin 33 and the mold 32 cooperating to define therebetween a mold space 34. The mold 31 is vertically movable by means of an upper hydraulic cylinder 35, the actuating rod 36 of which carries the injection mold 31 for movement from its lower, illustrated, injection molding position to an upper position (not illustrated).

The mold 31, when positioned as illustrated, is adapted to have its mold space 34 filled with thermoplastic material supplied by the extruder screw 13 when the valve 20 is moved to its open position, the mold 31 then being retracted upwardly by the cylinder 35 to accommodate the extrusion of a tube through the orifice 30 integral with material filling the mold cavity 34. After the extrusion of such tube, the extrusion is halted by closing the valve 20 and segmental blow molds 37 are closed by cylinders 38 onto the tube and the tube is inflated by blow air introduced through the injection mold core pin 33 to form blow molded portions of the article from the extruded tube.

This combined injection molding, extrusion and blow molding technique is fully disclosed in the copending application of Richard C. Allen and Leon E. Elphee, Seriol No. 797,276, filed in the United States Patent Office on March 4, 1959, now Patent No. 3,008,192, and assigned to the assignee of the present invention.

Also illustrated in the drawing is a hydraulic drive mechanism for the screw 13 comprising a sump 40 constituting a supply of hydraulic fluid for a pump 41 through suction line 42 and strainer 43, the pump being driven by suitable means, as by electric motor 44. The pressure discharge of the pump 41 is through line 45 to a hydraulic motor 46 which is coupled to the drive shaft 47 for the screw 13 through suitable speed changing apparatus 48. The hydraulic fluid is returned from hydraulic motor 46 through line 59 to sump 40.

The driving pressure for the hydraulic motor 46 is controlled by a pressure relief valve 50 connected to the conduit 45 through conduit 51 and having a compression spring 52 acting thereon to govern the relief pressure. Hydraulic fluid is dumped by the pressure relief valve 50 for return to sump 40 through heat exchanger 53 which is supplied with water or other coolant through line 54 under the control of a temperature control valve 55 thermostatically responsible to a temperature sensing element or thermostat 56 disposed in the sump 40. Water from the heat exchanger 53 is drained through a line 57.

The heat exchanger 53 is by-passed by a check valve 58 as a safety precaution.

*Operation*

In operation, the screw 13 is driven by the hydraulic motor 46 against the resistance of the thermoplastic material being plasticized by the screw and supplied thereby to the conduit 17.

Whenever material is being expressed through the extrusion orifice 30, the pressure within the passage 17 and the output pressure of the plasticized material will be dependent upon the factors normally involved and including the physical and thermal characteristics of the material being extruded, the resistance of the orifice 30, and the resistance of the passages intermediate the screw and the orifice to the flow of the plasticized material therethrough.

However, when material cannot be freely expressed through the orifice 30, as when the mold 31 is positioned as illustrated and is filled with plastic material or, more importantly, when the valve 20 is in its illustrated closed position, the pressure at the outlet end 16 of the screw and within the conduit 17 on the upstream side of the valve 20 increases rapidly, and, consequently, the resistance to turning movement of the screw 13 will substantially increase. When the resistance to such turning movement of the screw 13 increases beyond the driving capacity of the hydraulic motor 46, as determined by the fluid capacity of the motor and the pressure of hydraulic fluid supplied thereto through the line 45, the motor 46 will stall out, and rotation of the screw 13 will cease. However, the screw 13 will maintain pressure within the conduit 17, which pressure becomes immediately available to express material through the orifice 30 upon either upward movement of the mold 31 to open the extrusion orifice 30 or opening of the valve 20.

Of course, the pressures generated in the conduit 17, i.e., at the outlet end of the screw 13, upon the interruption of communication between the screw and the orifice are necessarily greater than the pressures required for the expression of material through the orifice 30. The magnitude of such pressures so generated is determined by the driving capabilities of the hydraulic drive motor 46. Preferably, the motor 46 is of a capacity only slightly in excess of that required for the normal expression of material through the extrusion orifice 30, so that the motor 46 is always operating at a "close-to-stall" condition. Thus, a relatively small increase in pressure at the discharge end of the screw would effectively stall out the motor 46. Any loss of pressure at the discharge end of the screw 13 due, for example, to normal dissipation of pressure due to thermal shrinkage in the material, leakage within the system, or the like, will immediately lessen the resistance of the screw to rotation, and the motor 46 will be energized to initiate rotation of the screw 13 so as to re-attain the pressure at which the motor again stalls out.

This operation of the motor 46 and the screw 13 is utilized to good advantage in combined injection molding and extrusion procedures. For example, the pressure generated in the closed conduit 17 upstream of the valve 20, i.e., at the output end of the screw 13 during closing of the valve, is in excess of normal extrusion pressures and, upon opening of the valve 20, this pressure immediately becomes available for use. Thus, this higher pressure available immediately following opening of the valve 20 is utilized for filling the injection mold 31 and maintaining the relatively small volume of material therein under such higher pressures during setting of the injection molded material in the mold space 34.

After the injection mold space 34 is filled, the valve 20 may be left open, so that the screw 13 continues to operate, in effect, within a closed system, inasmuch as no further material is being expressed through the orifice 30. Thus, the screw 13 again rapidly builds up the higher or "stall" pressure within the plasticized material and such pressure will be maintained until the mold 31 is moved from its illustrated position by actuation of the cylinder 35.

Upon such movement, the orifice 30 is opened to the normal expression of material at normal extrusion pressures, and the motor 46 will freely drive the screw 13, so long as material is being extruded through the orifice 30. When the extrusion of the tube is complete, the valve 20 is closed, the cylinders 38 are actuated to close the blow molds 37, and the extruded tube is blown to its final configuration. During the periods of blowing, article removal, and such other operations as may be performed prior to return of the mold 31 to its illustrated position overlying the orifice 30, the valve 20 is maintained closed and the higher motor-stalling pressures are generated within the conduit 17 and at the output end of the screw 13, which pressures become immediately available for a subsequent injection molding operation upon merely opening the valve 20.

Thus, it will be seen that the present invention provides an extremely simple extruder driving mechanism wherein the hydraulic drive motor is merely stalled out to cease rotation of the extruder screw whenever pressures at the output end of the screw exceed those pressures against which the motor 46 can drive the screw. Further, such pressures are readily maintained by the motor 46 despite the inherent or normal dissipation of the pressures within the system during periods at which material is not being expressed through the orifice.

Additionally, the supplying material at such higher pressures is extremely well adapted for combined injection molding and extrusion processes without the requirement of heretofore necessary extruder-supplementing accumulators, pistons or the like. Further, the material plasticized by the screw 13 cannot be trapped within elaborate recirculation conduits, accumulation chambers, or the like, and the residence time of the plasticized material within the system is held to a minimum, thereby preventing thermal degradation of those materials normally sensitive to extended storage at elevated plasticized temperatures.

We claim:

1. In a method of extruding at a predetermined pressure and through an extrusion orifice plasticized material from a rotatable screw the steps of rotating the screw by a hydraulic motor, intermittently interrupting communication between the screw and the orifice, continuing rotation of the screw to generate in said material a pressure greater than said predetermined pressure during such interruption, and stalling out the hydraulic motor by the resistance of the screw to rotation against said material at the greater pressure.

2. In a method of extruding plasticized material through an extrusion orifice, the material normally being supplied to the orifice at a predetermined pressure by a rotatable screw, the steps of hydraulically driving the screw, intermittently interrupting communication between the screw and the orifice, continued rotation of said screw generating a pressure greater than the normal extrusion pressure during such interruption, and stalling out the screw while continuously attempting to drive the screw against the resistance to rotation thereof presented by said generated pressure.

3. In a method of intermittently issuing plasticized material under pressure through an orifice, the material being supplied by a rotatable screw, the steps of driving the screw by a hydraulic motor constantly supplied with hydraulic fluid at a predetermined pressure, interrupting communication between the screw and the orifice, continued driving of the screw by said motor generating a pressure at the outlet end of said screw which is greater than the pressure at which material is issued from the orifice and stalling out the hydraulic drive motor for the screw by the resistance of the screw to rotation against such greater pressure, the continuing driving effort exerted by said motor maintaining the greater pressure at the outlet end of said screw.

4. In a method of intermittently issuing plasticized material through an orifice, the material being supplied at a predetermined pressure by a rotatable screw driven by a hydraulic motor, the steps of generating pressures greater than said predetermined pressure between issues of material through the orifice, halting rotation of the screw in response to such greater pressures by stalling out the hydraulic motor due to the resistance of the screw to rotation against such greater pressures, and maintaining such greater pressures during the entire period between issues of material by maintaining a constant drive effort on the stalled motor.

5. In a method of making an article by a combined injection molding, extruding and blowing technique and utilizing plasticized thermoplastic material supplied at a normal extrusion pressure from a plasticizer screw driven by a hydraulic motor constantly supplied with hydraulic fluid at a predetermined pressure, the steps of initially interrupting communication between the screw outlet and an extrusion orifice to generate in said material at the output end of the screw a pressure in excess of said normal pressure, stalling out the hydraulic motor by the increased resistance of the screw to rotation, establishing communication between the screw outlet and the orifice to injection mold a portion of the article at said excess pressure, extruding material through the orifice integral with the injection molded portion of the article at said normal pressure, and again interrupting communication between the screw and the orifice during blowing of the extruded material to a final configuration, thereby generating again said excess pressure at the outlet end of the screw prior to stalling out the motor.

6. In a method of cyclic injection molding and extruding plasticized material at an orifice, the steps of continuously supplying hydraulic fluid at a predetermined pressure to a hydraulic motor driving a plasticizer screw, driving the screw by said motor during an extrusion portion of the cycle to supply plasticized material from the output end of the screw to the orifice to be expressed therethrough at a normal extrusion pressure, upon the completion of the extrusion portion of the cycle stopping the expression of plasticized material through the orifice while continuing to drive the screw to generate at the outlet end of the screw a pressure greater than said normaal extrusion pressure, stalling out the motor against the resistance of said greater pressure despite the continued supplying of fluid under pressure thereto, thereby retaining material at the outlet end of said screw at said greater pressure, re-establishing the flow of plasticized material through the orifice and into an injection mold at said greater pressure, and thereby performing the injection molding portion of the cycle, concurrently moving the injection mold from the orifice and extruding material through the orifice at said normal extrusion pressure to thereby re-initiate the extrusion portion of said cycle.

References Cited in the file of this patent

UNITED STATES PATENTS

| | | |
|---|---|---|
| 2,369,553 | Fields | Feb. 13, 1945 |
| 2,411,971 | MacMillin et al. | Dec. 3, 1946 |
| 2,505,540 | Goldhard | Apr. 25, 1950 |
| 2,669,095 | Bishofberger | Feb. 16, 1954 |
| 2,881,477 | Triulzi | Apr. 14, 1959 |
| 2,944,288 | Sherman | July 12, 1960 |